US009042620B2

(12) United States Patent
Kohlberger et al.

(10) Patent No.: US 9,042,620 B2
(45) Date of Patent: May 26, 2015

(54) METHOD AND SYSTEM FOR MULTI-ORGAN SEGMENTATION USING LEARNING-BASED SEGMENTATION AND LEVEL SET OPTIMIZATION

(75) Inventors: Timo Kohlberger, Jersey City, NJ (US); Michal Sofka, Franklin Park, NJ (US); Jens Wetzl, Oberasbach (DE); Jingdan Zhang, Plainsboro, NJ (US); Shaohua Kevin Zhou, Plainsboro, NJ (US); Neil Birkbeck, Plainsboro, NJ (US); Jerome Declerck, Oxford (GB); Jens Kaftan, Oxford (GB)

(73) Assignee: Siemens Corporation, Iselin, NJ (US)

( * ) Notice: Subject to any disclaimer, the term of this patent is extended or adjusted under 35 U.S.C. 154(b) by 469 days.

(21) Appl. No.: 13/416,508

(22) Filed: Mar. 9, 2012

(65) Prior Publication Data

US 2012/0230572 A1    Sep. 13, 2012

Related U.S. Application Data

(60) Provisional application No. 61/451,371, filed on Mar. 10, 2011.

(51) Int. Cl.
*G06K 9/00* (2006.01)
*G06T 7/00* (2006.01)
*G06K 9/62* (2006.01)

(52) U.S. Cl.
CPC ............ *G06T 7/0083* (2013.01); *G06K 9/6209* (2013.01); *G06T 2207/10081* (2013.01); *G06T 2207/20081* (2013.01); *G06T 2207/20161* (2013.01); *G06T 2207/30048* (2013.01); *G06T 2207/30084* (2013.01)

(58) Field of Classification Search
None
See application file for complete search history.

(56) References Cited

U.S. PATENT DOCUMENTS

| | | | |
|---|---|---|---|
| 7,277,582 B2 | 10/2007 | Paragios | |
| 7,574,247 B2* | 8/2009 | Moreau-Gobard et al. | 600/407 |
| 8,064,673 B2 | 11/2011 | Kirchberg et al. | |
| 8,175,348 B2 | 5/2012 | Van Uitert et al. | |
| 8,218,870 B2 | 7/2012 | Tieu et al. | |
| 2005/0105786 A1* | 5/2005 | Moreau-Gobard et al. | 382/128 |
| 2006/0093199 A1* | 5/2006 | Fram et al. | 382/128 |
| 2006/0173272 A1* | 8/2006 | Qing et al. | 600/407 |
| 2006/0177133 A1* | 8/2006 | Kee | 382/173 |
| 2009/0041315 A1 | 2/2009 | Fahmi et al. | |
| 2010/0080434 A1* | 4/2010 | Seifert et al. | 382/131 |
| 2011/0074780 A1 | 3/2011 | Roberts et al. | |
| 2011/0299745 A1 | 12/2011 | Roberts et al. | |

OTHER PUBLICATIONS

Hierarchical Parsing and Semantic Navigation of Full Body CT Data S. Seiferta, A. Barbub, K. Zhouc, D. Liuc, J. Feulnera, M. Hubera, M. Suehlingd, A. Cavallaroe and D. Comaniciuc SPIE 2009.*

* cited by examiner

*Primary Examiner* — Nancy Bitar

(57) ABSTRACT

A method and system for automatic multi-organ segmentation in a 3D image, such as a 3D computed tomography (CT) volume using learning-base segmentation and level set optimization is disclosed. A plurality of meshes are segmented in a 3D medical image, each mesh corresponding to one of a plurality of organs. A level set in initialized by converting each of the plurality of meshes to a respective signed distance map. The level set optimized by refining the signed distance map corresponding to each one of the plurality of organs to minimize an energy function.

29 Claims, 5 Drawing Sheets

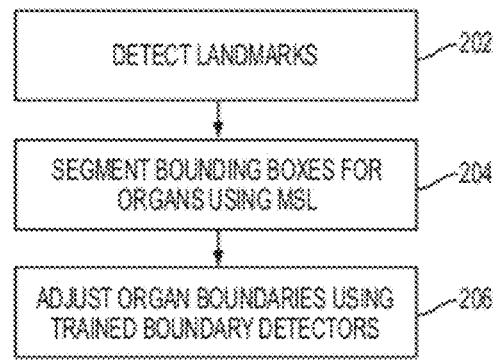
FIG. 2
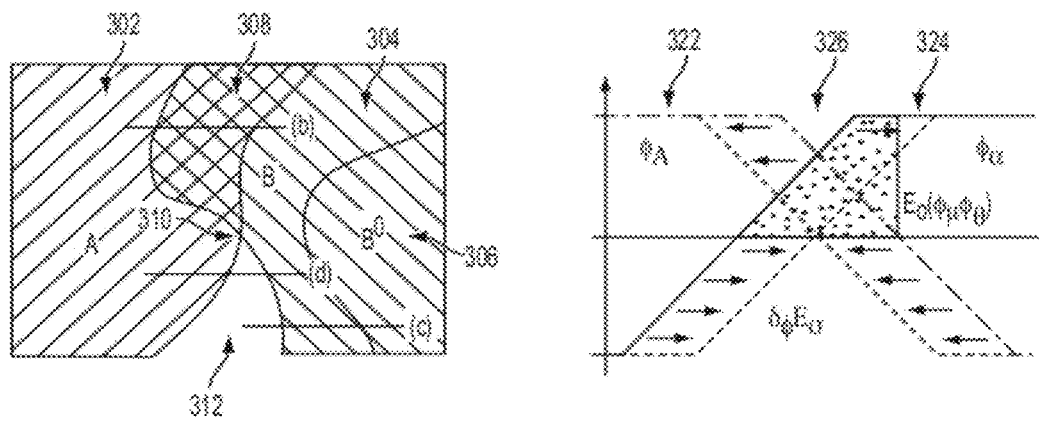
FIG. 3a  FIG. 3b
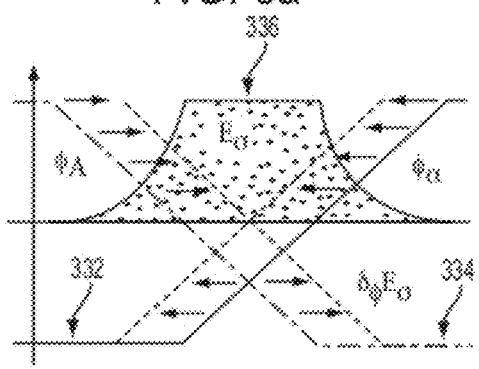 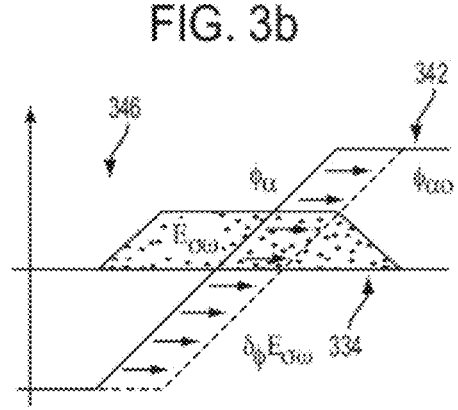
FIG. 3c  FIG. 3d

METHOD AND SYSTEM FOR MULTI-ORGAN SEGMENTATION USING LEARNING-BASED SEGMENTATION AND LEVEL SET OPTIMIZATION

This application claims the benefit of U.S. Provisional Application No. 61/451,371, filed Mar. 10, 2011, the disclosure of which is herein incorporated by reference.

BACKGROUND OF THE INVENTION

Discriminative segmentation approaches are capable of providing reliable, fully automatic, and fast detection of anatomical landmarks within volumetric (3D) medical images. Discriminative segmentation approaches are also capable of providing accurate determination of organ boundaries, such as boundaries of the inner and outer walls of the heart or a boundary of the liver, in volumetric medical images. Typically, a surface segmented using such discriminative segmentation techniques is represented by a relatively low number of control points, such that the control points can be used in Active Shape Models (ASM).

In addition to restrictions in topology, another disadvantage of such point-cloud based shape representations is the dependence of the local detailedness on the local density of control points. The control points are often non-homogeneously distributed across the shape boundary, and thus yield varying levels of segmentation accuracy. Level set based shape representations, on the other hand, are capable of encoding segmented boundaries at a homogenous resolution, with simple up-sampling and down-sampling schemes, and may provide other advantages over point cloud shape representations as well.

BRIEF SUMMARY OF THE INVENTION

The present invention provides a method and system for fully automatic segmentation of multiple organs in computed tomography (CT) data using learning based segmentation and level set optimization. Embodiments of the present invention combine the advantages of learning-based and level set segmentation approaches and their employed shape representations. In particular, in various embodiments of the present invention, point-to-point correspondences, which are estimated during the learning-based segmentation, are preserved in the level set segmentation. Furthermore, embodiments of the present invention provide novel terms for level set energy minimization which allow region-specific non-overlap, coincidence, and/or shape similarity constraints to be imposed.

In one embodiment, a plurality of meshes are segmented in a 3D medical image, each mesh corresponding to one of a plurality of organs. A level set in initialized by converting each of the plurality of meshes to a respective signed distance map. The level set optimized by refining the signed distance map corresponding to each one of the plurality of organs to minimize an energy function.

These and other advantages of the invention will be apparent to those of ordinary skill in the art by reference to the following detailed description and the accompanying drawings.

BRIEF DESCRIPTION OF THE DRAWINGS

FIG. 2 illustrates a method for learning-based multi-organ segmentation in a medical image volume according to an embodiment of the present invention;

FIG. 3 illustrates imposing geometric constraints on the level set segmentation;

DETAILED DESCRIPTION

The present invention is directed to a method for fully automatic segmentation of multiple organs in a medical image volume, such as a computed tomography (CT) volume. Embodiments of the present invention are described herein to give a visual understanding of the multi-organ segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention provide fully automatic multi-organ segmentation in volumetric medical images, such as 3D CT images, using learning-based segmentation and level set optimization. Embodiments of the present invention combine advantages of learning-based segmentation approaches on point cloud-based shape representations, such as speed, robustness, and point correspondences, with advantages of partial differential equation (PDE) optimization based level set approaches, such as high accuracy and straightforward prevention of segment overlaps.

Figure 1:
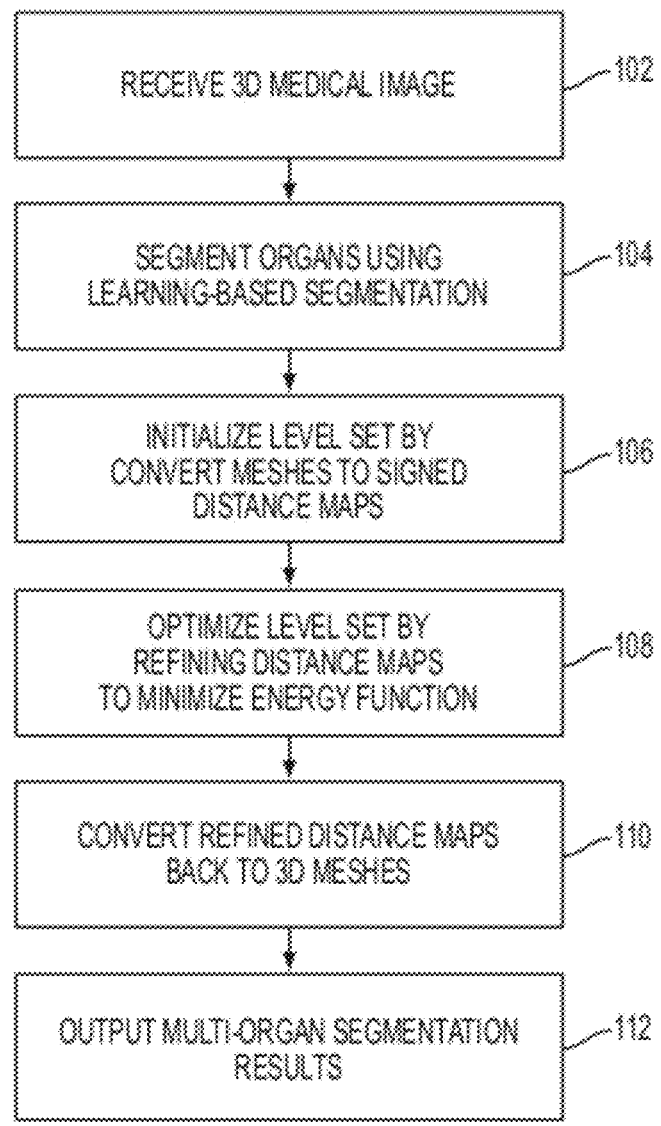
FIG. 1 illustrates a method for automatic multi-organ segmentation method according to an embodiment of the present invention.

FIG. 1 illustrates a method for automatic multi-organ segmentation method according to an embodiment of the present invention. At step 102, a medical image volume is received. In an advantageous embodiment, the medical image volume is a CT volume, but the present invention is not limited thereto and the method of FIG. 1 may be similarly applied to other imaging modalities as well. The medical image volume may be received directly from an image acquisition device, such as a CT scanning device, or the medical image volume may be received by loading a stored medical image volume, for example, from a memory or storage of a computer system.

At step 104, multiple organs are segmented in the medical image volume using learning-based segmentation, resulting a segmented mesh for each organ. "Learning-based segmentation" refers to any segmentation technique that utilizes trained machine learning-based classifiers or detectors to detect or segment one or more organs in medical image data. For example, the method described for segmenting boundaries of multiple organs in a full body CT scan in U.S. Pat. No. 2010/0080434, which is incorporated herein by reference, may be used to implement step 104. According to an advantageous aspect of the present invention, explicitly represented boundary surfaces resulting from a learning-based detected framework will be used to initialize a multi-region level set segmentation. Such a learning-based detection framework may include multiple stages, as shown in FIG. 2.

FIG. 2 illustrates a method for learning-based multi-organ segmentation in a medical image volume according to an embodiment of the present invention. As illustrated in FIG. 2, at step 202, in a first stage, anatomical landmarks related to target organs are detected in the medical image volume using trained landmark detectors. The anatomical landmarks may include organ center points as well as other anatomical landmarks that have clinical importance or help to constrain the search for the organs. For example, the anatomical landmarks detected in the medical image volume may include organ centers of the heart, liver, both kidneys, spleen, bladder, and prostate, as well as the other anatomical landmarks such as the left and right lung tips, left and right humerus heads, bronchial bifurcation, left and right shoulder blade tips, inner left and right clavicle tips, sternum tip bottom, aortic arch, left and right endpoints of one or more particular rib (e.g. rib 11), bottom front and back of one or more particular vertebra (e.g., verteba L5), coccyx, pubica symphysis top, and left and right corners of the hip bone, but the present invention is not limited thereto. A respective landmark detector is trained for each anatomical landmark based on annotated training data. Each landmark detector may be training based on the training data using a probabilistic boosting tree (PBT) and Haar features. The anatomical landmarks can be detected sequentially, such that as landmarks are detected, the detected landmarks are used to constrain the search space for those landmarks not yet detected. For example, such a landmark detection strategy can be implemented using the method described in Lui et al., "Search Strategies for Multiple Landmark Detection by Submodular Maximization", Computer Vision and Pattern Recognition 2010, 0:2831-2838, 2010, which is incorporated herein by reference.

At step 204, in a second stage of learning-based segmentation, bounding boxes are estimated each of the target organs using marginal space learning (MSL)-based detectors initialized from a subset of the detected anatomical landmarks. For example, the MSL-based detectors provide reliable estimates of bounding boxes for the liver, the left and right lungs, the heart, the left and right kidneys, as well as other organs such as the spleen, bladder, and prostate. The search space for MSL-based detection of each organ's bounding box may be constrained by the detected anatomical landmarks. MSL is used to estimate the position, orientation, and scale of each organ in the 3D volume using a series of detectors trained using annotated training data. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. A 3D object detection (object pose estimation) is split into three steps: object position estimation, position-orientation estimation, and position-orientation-scale estimation. A separate classifier is trained based on annotated training data for each of these steps. Each classifier may be trained using a PBT. The MSL-based detection results in an estimated transformation (position, orientation, and scale) defining a bounding box for each organ, and a mean shape of each organ (learned from training data) is aligned with the 3D volume using the estimated transformation. MSL-base object detection is described in greater detail in U.S. Pat. No. 7,916,919, issued Mar. 29, 2011, and entitled "System and Method for Segmenting Chambers of a Heart in a Three Dimensional Image", which is incorporated herein by reference.

At step 206, in third stage of learning-based segmentation, trained organ-specific boundary detectors are used to adjust organ boundaries. In particular, trained organ-specific boundary detectors may be used first at a coarse resolution to correct the organ boundaries and then subsequently at a fine resolution. In addition, principal-component analysis a (PCA)-based statistical shape model can be used for each organ to regularize the boundary shape on the coarse resolution. This step results in the segmented boundaries for each organ being represented by a triangulated mesh, i.e., a connected point cloud, as used in Active Shape Models.

Returning to FIG. 1, at step 106, a level set is initialized by converting the segmented mesh for each organ into a signed distance map. Although the learning-based segmentation provides accurate individual organ segmentations, the segmented organs sometimes exhibit small overlaps between adjacent organ boundaries or gaps where true organ boundaries coincide. Given the representations of only the adjacent segments' boundaries such deficiencies are difficult to detect and remove. Instead, signed distance functions (maps) $\phi_i: R^3 \Rightarrow R$ are initialized from each of the segmented meshes $C_i$, for i=1, ... N organs by employing a fast mesh voxelization algorithm. The fast mesh voxelization algorithm voxelizes each mesh in order to create a binary mask in which voxels inside a segmented organ boundary have one value and voxels not inside the segmented organ boundary have another value. A distance transformation is then applied to the binary mask for each mesh to generate a distance map in which the value of each point is distance of that point from the boundary. Accordingly, the boundary information for a segmented organ is encoded implicitly in the zero crossings of the signed distance map $\phi_i$ i.e., $C:=\{x|\phi(x)=0, |\nabla\phi|=1\}$, with $|\nabla\phi|=1$ denoting the so-called distance property, and $\phi>0$ inside the object boundary and $\phi<0$ outside of the object boundary. The distance maps $\phi_i$ are discretized on a regular grid, which is assumed to be the same for all organs. Furthermore, a narrow-band level set scheme may be employed, which maintains the distance property in a small narrow-band of ±2 voxels from the zero crossing.

At step 108, the level set is optimized by refining the signed distance maps representing the organ boundaries to minimize and energy function. In an advantageous embodiment, the energy function can be a sum of a plurality of energy terms, with each energy term representing a different constraint imposed on the signed distance map representing the organ boundaries. The energy function can be minimized by iteratively adjusting each of the signed distance maps using a gradient descent algorithm.

Once the triangulated boundary meshes $\{C_i\}$, resulting from the learning-based detection are converted to level set functions $\{\phi_i\}$, detecting and removing local overlaps and gaps between adjacent organ boundaries can be realized much easier. The goal is to find the correct separating boundary between two neighboring organs. To that end, embodiments of the present invention provide a level set segmentation approach that not only refines the segmentation boundary in detailedness and removes local overlaps and gaps, but also finds the true separating boundary given that enough image information is available.

For each organ $O_i$, this refining level set segmentation is realized by employing gradient descent iterations to converge to a minimum of an associated energy function $E_i(\phi_i)$, given the initial distance maps as starting points. A data dependent energy term of the energy function can be expressed as:

$$E_P(\phi) = -\alpha \int_\Omega H(\phi) \log p_{in}(I(x)|\phi) + (1-H(\phi)) \log p_{out}(I(x)|\phi) dx, \quad (1)$$

with H denoting the Heaviside step function, and $p_{in/out}$ referring to the non-parametric probability estimates of the intensities inside and outside of the current segment $\phi$ using a Parzen density estimator with a Gaussian kernel, and $\alpha$ being a constant weight that can be set by one skilled in the art based on experimental data. In order to add robustness against noisy data, a boundary smoothness regularization energy term may also be incorporated into the energy function. The boundary smoothness regularization energy term can be expressed as:

$$E_c(\phi) = \int_\Omega \gamma_{l(x)} |\nabla H(\phi)| dx, \qquad (2)$$

$$\text{with } l(x) = \arg\min_{i=1,\ldots,M} \|x - p_i\|_{L_2}$$

which is weighted at various strengths depending on the region of the organ surface. Thereby, the boundary specific weights $\gamma_{l(x)}$ are associated with a set of boundary points $p_1, \ldots, p_M \in R^3$, which are tracked along with the evolving zero-crossing of the current distance map $\phi$ and thus provide shape correspondences. According to an advantageous implementation, these correspondence points are initialized directly by vertices of the segmented organ meshes resulting from the learning-based segmentation, since point-to-point correspondences are estimated in the segmented meshes as well.

Another energy term may be incorporated into the energy function to provide a disjoint constraint to remove overlaps between adjacent organs. Let $C_A^0$ and $C_B^0$ represent two closed surfaces which are imperfect approximations of the outer boundaries of two adjacent organs, and assume that partial overlaps are present. FIG. 3 illustrates imposing geometric constraints on the level set segmentation. As shown image (a) of FIG. 3, region A (302) and region B (304) partially overlap. Given the implicit level set representation of the two surfaces, $\phi_A^0$ and $\phi_B^0$, locations $\tilde{x}$ inside of the overlapping region are exclusively characterized by both $\phi_A(\tilde{x})>0$ and $\phi_B(\tilde{x})>0$, and thus provide a much simpler overlap indicator as compared to any other based on an explicit shape representation. Accordingly, the disjoint constraint energy term, which explicitly penalizes overlaps, can be expressed as:

$$E_O(\phi_A, \phi_B) := \int_\Omega H(\phi_A(x)) H(\phi_B(x)) \phi_B(x) dx \qquad (3)$$

where the first product (of the step functions H for $\phi_A$ and $\phi_B$) in the integrand is unequal to zero only inside the overlap regions. According to an advantageous implementation, the second distance function $\phi_B$ is also multiplied to the product of step functions, which makes $E_O$ smoother at the presence of small overlaps, and thereby decease oscillations during gradient descent. The corresponding energy gradient can be expressed as:

$$\partial \phi_A/\partial t = -\partial E_O/\partial \phi_A = -\partial_\epsilon(\phi_A) H_\epsilon(\phi_B(x)) \phi_B(x) \qquad (4)$$

Image (b) of FIG. 3 shows the distance maps $\phi_A$ 322 and $\phi_B$ 324 for regions A (302) and B (304) along a 1D cut along line 308 in image (a). As shown in image (b) of FIG. 3 the disjoint constraint energy $E_O$ (326) is only unequal to zero in the overlap region between A and B, and thus results a gradient step $\partial_\phi E_O$ for each of the distance maps $\phi_A$ 322 and $\phi_B$ 324 to eliminate the overlap region.

Another energy term may be incorporated into the energy function to provide a local proximity constraint to fill erroneous gaps between adjacent organ boundaries. In particular, the following local proximity energy term can be added to the energy function to remove erroneous gaps:

$$E_d(\phi_A, \phi_B) := \frac{1}{2} \int_\Omega \beta_{l(x)} (\phi_A(x) + \phi_B(x) + D)^2 dx \qquad (5)$$

where D is a constant that can be changed to enforce neighboring boundaries being a certain distance apart. In a possible implementation, D=0 to enforce that no gap exists between the neighboring boundaries. However, the present invention is not limited thereto, and it is possible to enforce the two boundaries to not touch but stay in a predefined distance D>0 from each other. $\{\beta_i\}$ denotes correspondence points-bound weights with $\beta_i=0$ at correspondence points where no boundary coincidence ought to be enforced, and some $\beta_i>0$ at correspondence points where the boundary coincidence with the neighboring region should be enforced. Accordingly, the weight $\{\beta_i\}$ changes depending on where on the boundary this energy term is being evaluated. This allows the local proximity constraint energy term to only be applied to certain predetermined points on a boundary for which it is known that no gap should exist.

Image (c) of FIG. 3 shows the distance maps $\phi_A$ 332 and $\phi_B$ 334 for regions A (302) and B (304) along a 1D cut along line 310 in image (a). As shown in image (c) of FIG. 3 the local proximity constraint energy $E_d$ (336) due to $\phi_A$ 332 and $\phi_B$ 334 will cancel each other out if their zero crossings coincide since the integrand in Equation (5) becomes zero. The gradient descent partial differential equation (PDE) of $E_d$ with respect to $\phi_A$ can be expressed as:

$$\partial \phi/\partial t = -\partial E_d/\partial \phi = -\beta_{l(x)}(\phi_A(x) + \phi_B(x) + D) \qquad (6)$$

which shows that at zero crossings $C_A$ of the distance transform $\phi_A$, the distance map $\phi_A$ is increased and thus $C_A$ expands at locations where $\phi_B<D$, the distance map $\phi_A$ is decreased and thus $C_A$ shrinks at locations where $\phi_B<D$.

A template constraint energy term can also be added to the energy function to enforce similarity of the level set result to an initial shape from the learning-based segmentation. This term ensures that the refined boundary is sought only in the vicinity of its initialization and prevents a region representing an organ from leaking it neighboring organs. The template constraint energy term can be expressed as:

$$E_{sw}(\phi, \phi_P) := \frac{1}{2} \int_\Omega \omega_{l(x)}^{in} H(\phi_P(x) - \phi(x)) + \omega_{l(x)}^{out} H(\phi(x) - \phi_P(x)) dx. \qquad (7)$$

Figure 4:
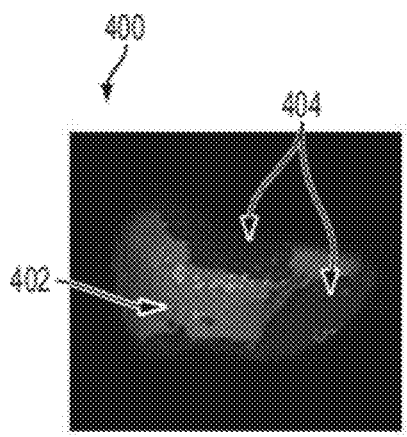
FIG. 4 illustrates an exemplary weight map of the regions specific weights for the outward template constraint.

$\{w_i^{in}\}$ and $\{w_i^{out}\}$ are region-specific weights (i.e., weights that vary based on the correspondence points) that are applied the shape dissimilarity measures between the current distance map $\phi$ and the template distance map $\phi_P$ (which is the initial distance map generated from segmented organ mesh). $\{w_i^{in}\}$ and $\{w_i^{out}\}$ represent different weights applied for deviations inside of the template shape $C_P$ and outside of the template shape $C_P$, respectively. FIG. 4 illustrates an exemplary weight map 400 of the regions specific weights $\{w_i^{in}\}$ for the outward template constraint. As shown in FIG. 4, the weights in then weight map 400 vary along with correspondence points on the boundary of the segmented organ, with correspondence points 402 having a maximum weight and correspondence points 404 having a minimum weight.

In equation (7), it can be noted that the first term of the integrand is non-zero only if the zero crossing of $\phi$ resides inside the zero crossing of $\phi_P$; that is, the current boundary C is smaller than the template boundary $C_P$. The second term in the integrand measures local expansions relative to the $C_P$ by becoming non-zero only where $\phi(x) > \phi_P(x)$. The corresponding energy gradient clearly shows that the proposed energy term has the desired effect:

$$\partial\phi/\partial t = -\partial E_{sw}/\partial\phi = w_{l(x)}^{in}\delta_\epsilon(\phi_P(x)-\phi(x)) - w_{l(x)}^{out}\delta_\epsilon(\phi(x)-\phi_P(x)), \quad (8)$$

as $\phi$ is increased at locations where $\phi < \phi_P$ and is decreased when $\phi > \phi_P$.

Image (d) of FIG. 3 shows the distance maps $\phi_B$ 342 and $\phi_{B^0}$ 344 for region B (304) and template region $B^0$ (306) along a 1D cut along line 312 in image (a). As shown in image (d) of FIG. 3, the template constraint energy $E_{sw}$ is reduced by gradient step $\partial_\phi E_{sw}$ for the distance map $\phi_B$ 342 towards $\phi_{B^0}$ 344.

In an advantageous embodiment, all of the energy terms described above are combined into energy minimizations for each organ $O_{i=1,\ldots N}$.

$$\min_{\phi_i} E_P(\phi_i) + E_c(\phi_i) + \sum_{j \in N_i(j)} E_O(\phi_i,\phi_j) + \sum_{j \in P_i(j)} E_d(\phi_i,\phi_j) + E_{sw}(\phi_i\phi_i^0) \quad (9)$$

which are mutually coupled by the disjoint and proximity terms ($N_i$ denotes the indices of organs adjacent to $O_i$, and $P_i$ denotes indices of organs with which $O_i$ shares a mutual proximity constraint). Consequently, minimizers $\{\tilde\phi_i\}$ of these individual energies depend on each other. An advantageous implementation utilizes interleaved gradient descent iterations to refine the distance maps of the organs in order to improve the multi-organ segmentation results. In particular, decent is carried out along the negative gradients of the N per-organ energies in lockstep, while using the level set segmentation results $\{\phi_i^{t-1}\}$ of the previous joint iteration to calculate the coupled energy gradients $\partial E_i(\phi_i; \{\phi_i^{t-1}\})/\partial\phi_i$. The descent for a particular energy (i.e., for a particular organ) is terminated if a maximum number of iterations has been reached, or if the maximum norm of its gradient fall below a given threshold, i.e., the segmentation boundary $\phi_i$ changes less than a certain tolerance.

Returning to FIG. 1, at step 110, the revised level set distance maps for the organs are converted back to 3D meshes. The 3D mesh for each organ can be extracted from the respective revised level set map using the well known marching cubes algorithm. At step 112, the multi-organ segmentation results are output. For example, the multi-organ segmentation results can be output by displaying the segmented organ meshes on a display device of a computer system. The multi-organ segmentation results can also be output by saving the segmentation results to a memory or storage of a computer system.

Figures 5A, 5B:
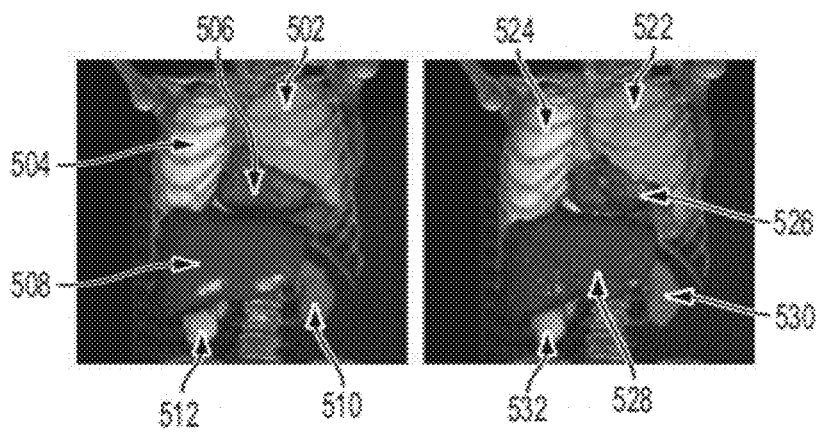
FIG. 5 illustrates exemplary multi-organ segmentation results.
Figure 6A:
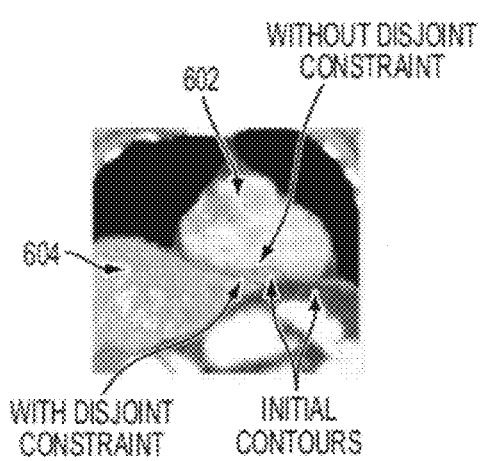
FIG. 6 illustrates the effect of the geometric constraints on exemplary segmented organs.
Figure 6B:
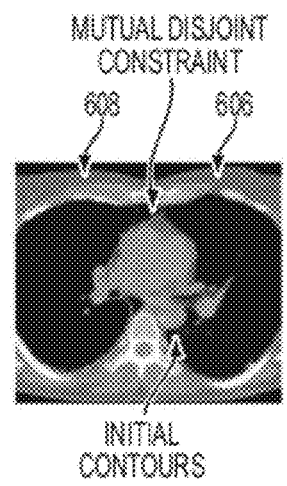
Figure 6C:
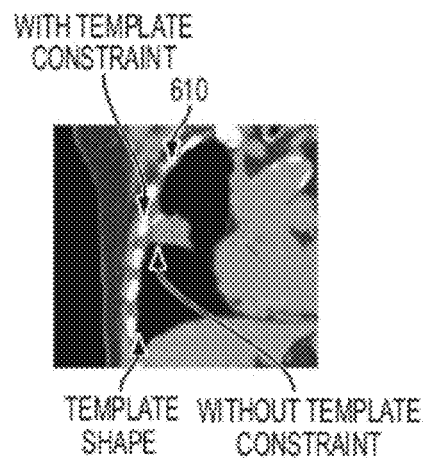
Figure 6D:
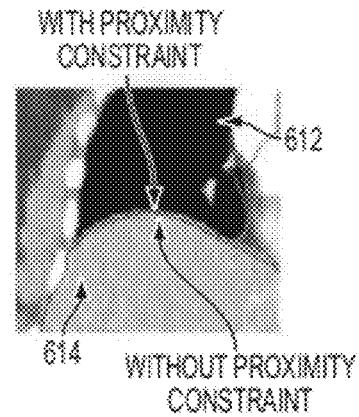

FIG. 5 illustrates exemplary multi-organ segmentation results. As illustrated in FIG. 5, image 500 shows initial segmentation results for the left lung 502, right lung 504, heart 506, liver 508, left kidney 510, and right kidney 512 resulting from learning-based segmentation. Image 520 shows refined segmentation results for the left lung 522, right lung 524, heart 526, liver 528, left kidney 530, and right kidney 532 resulting from the level set optimization of the learning-based segmentation results.

In a series of experiments, the present inventors studied the effect of the energy terms described herein qualitatively on a number of data sets, and thereby manually selected parameter values that are advantageous, especially for the correspondence-bound local weights, with respect to the overall segmentation accuracy and robustness. FIG. 6 illustrates the effect of the geometric constraints on exemplary segmented organs. Image (a) of FIG. 6 shows the effects of the disjoint constraint on adjacent heart and liver boundaries 602 and 604, respectively. Image (b) shows the effects of the disjoint constraint on left and right lung boundaries 606 and 608, respectively. Image (c) shows the effects of the template constraint on a segmented lung boundary 610. Image (d) shows the effect of the local proximity constraint on segmented right lung and liver boundaries 612 and 614, respectively.

The benefit of the disjoint constraint is clear, since the true organ boundaries do not overlap. When adding highly-weighted mutual disjoint terms to each organ's energy minimization, overlaps in the initial segments vanish during the first iteration. Thereby, the location of the final joint boundary interface mainly depends ratio between weights of the mutual terms, e.g. those of $E_O(\phi_A, \phi_B)$ in $E_A$ and $E_O(\phi_B, \phi_A)$ in $E_B$, respectively. This ratio may be different from 1 however, in case the initial boundary of one organ is known to be more accurate and robust than that if its neighbor. That, in one example, is the case for the heart and the liver boundaries in image (a) of FIG. 6.

Whereas a single weight for $E_O$ within each organ's total energy is sufficient, the local proximity term $E_d$ is designed to be active, i.e. its weight unequal zero, at specific boundary locations that are to coincide (or stay in fixed proximity) to that of an adjacent organ. This localization, as described above, is realized by the tracking a discrete set of correspondence points on the border of an organ, to which local energy term weights are associated with (see FIG. 4 for an example of associating weights with correspondence points). In an advantageous implementation, $E_d$ is used to enforce a top portion of the boundary of the liver to coincide a bottom portion of the right lung, as shown in image (d) of FIG. 6. This is often not achieved by a data term alone doe to a smoothed edge stemming from partial voluming effects.

As for the employment of template constraints, we found them most useful in constraining the refinement boundary to the initial boundary with locally-varying degrees of strength in addition, deviations inside or outside the initial shape can be constrained separately, which can be seen in the example of image (d) of FIG. 6.

Figure 7:
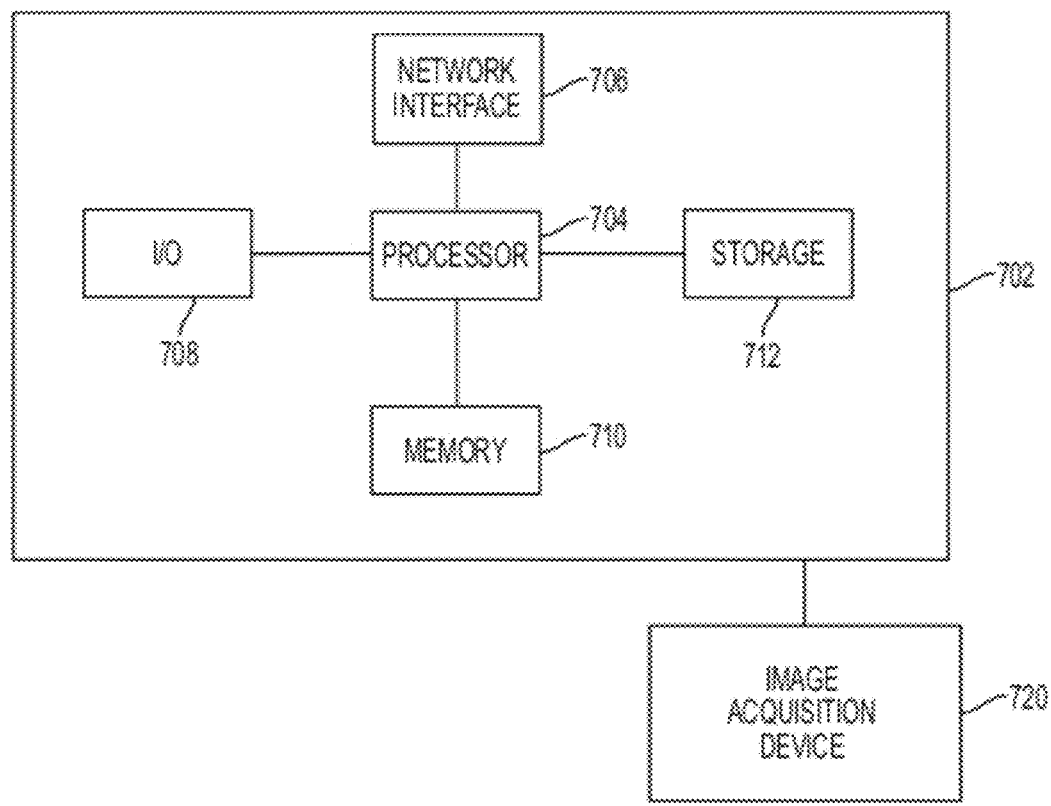
FIG. 7 is a high level block diagram of a computer capable of implementing the present invention.

The above-described methods for multi-organ segmentation and level set optimization may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the steps of the methods of FIGS. 1 and 2 may be defined by the computer program instructions stored in the memory 710 and/or storage 712 and controlled by the processor 704 executing the computer program instructions. An image acquisition device 720, such as an CT scanning device, can be connected to the computer 702 to input the 3D images (volumes) to the computer 702. It is possible to implement the image acquisition device 720 and the computer 702 as one device. It is also possible that the image acquisition device 720 and the computer 702 communicate wiredly or wirelessly through a network. The computer 702 also includes one or more network interfaces 706 for communicating with other devices via a network. The computer 702 also includes other input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for multi-organ segmentation in a 3D medical image comprising:
   segmenting a plurality of meshes each corresponding to one of a plurality of organs in the 3D medical image;
   initializing a level set by converting each of the plurality of meshes to a respective signed distance map; and
   optimizing the level set by refining the respective signed distance map corresponding to each one of the plurality of organs to minimize a respective energy function.

2. The method of claim 1, further comprising:
   generating a respective refined 3D mesh for each one of the plurality of organs from the respective refined distance map corresponding to each one of the plurality of organs.

3. The method of claim 1, wherein the respective energy function for each one of the plurality of organs includes a data energy term, a regularization energy term, and at least one energy term that imposes a geometric constraint on the respective signed distance function.

4. The method of claim 1, wherein the energy function includes a disjoint constraint energy term to remove overlaps between signed distance maps corresponding to adjacent organs.

5. The method of claim 4, wherein the disjoint energy term is expressed as:

$$E_O(\phi_A, \phi_B) := \int_\Omega H(\phi_A(x)) H(\phi_B(x)) \phi_B(x) dx,$$

where $\Phi_A$ and $\phi_B$ are signed distance maps corresponding to adjacent organs, and H is a Heaviside step function.

6. The method of claim 1, wherein the energy function includes a local proximity constraint energy term to remove gaps between portions of signed distance maps corresponding to portions of adjacent organs that stay in fixed proximity.

7. The method of claim 6, wherein the local proximity constraint energy term is expressed as:

$$E_d(\phi_A, \phi_B) := \frac{1}{2} \int_\Omega \beta_{l(x)} (\phi_A(x) + \phi_B(x) + D)^2 dx,$$

where $\phi_A$ and $\phi_B$ are signed distance maps corresponding to first and second adjacent organs, D is a constant specifying a fixed proximity distance, l(x) is a set of correspondence points that provide shape correspondence, wherein the correspondence points are initialized using vertices of the segmented mesh for the first organ, and $\beta_{l(x)}$ is a correspondence point-bound weight that is greater than zero for correspondence points located a portions of the first organ that stay in fixed proximity with the second organ.

8. The method of claim 1, wherein the energy function includes a template constraint energy term enforce similarity of a refined distance map to the corresponding signed distance map initialized by converting one of the plurality of segmented meshes.

9. The method of claim 1, wherein the template constraint energy term is expressed as:

$$E_{sw}(\phi, \phi_P) := \frac{1}{2} \int_\Omega \omega_{l(x)}^{in} H(\phi_P(x) - \phi(x)) + \omega_{l(x)}^{out} H(\phi(x) - \phi_P(x)) dx,$$

where $\phi$ is a current signed distance map corresponding to a first organ, $\phi_P$ is an initial signed distance map initialized from the segmented mesh of the first organ, H is a Heaviside step function, l(x) is a set of correspondence points that provide shape correspondence, wherein the correspondence points are initialized using vertices of the segmented mesh for the first organ, $\{w_i^{in}\}$ is a set of correspondence point-based weights applied to deviations inside a zero-crossing of $\phi_P$, and $\{w_i^{out}\}$ is a set of correspondence point-based weights applied to deviations outside a zero-crossing of $\phi_P$.

10. The method of claim 1, wherein the step of optimizing the level set by refining the respective signed distance map corresponding to each one of the plurality of organs to minimize a respective energy function comprises:
   for each organ $O_{i=1,\ldots,N}$, calculating the energy minimization:

$$\min_{\phi_i} E_p(\phi_i) + E_c(\phi_i) + \sum_{j \in N_i(j)} E_O(\phi_i, \phi_j) + \sum_{j \in P_i(j)} E_d(\phi_i, \phi_j) + E_{sw}(\phi_i, \phi_i^0),$$

where $\phi_i$ is the signed distance map corresponding to $O_i$, $E_P(\phi_i)$ is a data energy term, $E_c(\phi_i)$ is a smoothing regularization energy term, $N_i$ denotes the indices of organs adjacent to $O_i$, $E_O(\phi_i, \phi_j)$ is a disjoint constraint energy term to remove overlaps between $\phi_i$ and $\phi_j$, $P_i$ denotes indices of organs with which $O_i$ shares a mutual proximity constraint, $E_d(\phi_i, \phi_j)$ is a local proximity constraint energy term to remove erroneous gaps between $\phi_i$ and $\phi_j$, $\phi_i^0$ is an initial signed distance map initialized from the segmented mesh corresponding to $O_i$, and $E_{sw}(\phi_i, \phi_j^0)$ is a template constraint energy term to enforce similarity in the shapes of $\phi_i$ and $\phi_i^0$.

11. The method of claim 1, wherein the step of optimizing the level set by refining the respective signed distance map corresponding to each one of the plurality of organs to minimize a respective energy function comprises:
   minimizing the respective energy function for each of the plurality of organs using a plurality of interleaved gradient descent iterations, wherein at each iteration, the respective signed distance map corresponding to each one of the plurality of organs is refined to reduce the respective energy function.

12. An apparatus for multi-organ segmentation in a 3D medical image comprising:
   means for segmenting a plurality of meshes each corresponding to one of a plurality of organs in the 3D medical image;
   means for initializing a level set by converting each of the plurality of meshes to a respective signed distance map; and means for optimizing the level set by refining the respective signed distance map corresponding to each one of the plurality of organs to minimize a respective energy function.

13. The apparatus of claim 12, further comprising:
means for generating a respective refined 3D mesh for each one of the plurality of organs from the respective refined distance map corresponding to each one of the plurality of organs.

14. The apparatus of claim 12, wherein the respective energy function for each one of the plurality of organs includes a data energy term, a regularization energy term, and at least one energy term that imposes a geometric constraint on the respective signed distance function.

15. The apparatus of claim 12, wherein the energy function includes a disjoint constraint energy term to remove overlaps between signed distance maps corresponding to adjacent organs.

16. The apparatus of claim 12, wherein the energy function includes a local proximity constraint energy term to remove gaps between portions of signed distance maps corresponding to portions of adjacent organs that stay in fixed proximity.

17. The apparatus of claim 12, wherein the energy function includes a template constraint energy term enforce similarity of a refined distance map to the corresponding signed distance map initialized by converting one of the plurality of segmented meshes.

18. The apparatus of claim 1, wherein the means for optimizing the level set by refining the respective signed distance map corresponding to each one of the plurality of organs to minimize a respective energy function comprises:
means for minimizing the respective energy function for each of the plurality of organs using a plurality of interleaved gradient descent iterations.

19. A non-transitory computer readable medium encoded with computer executable instructions for multi-organ segmentation in a 3D medical image, the computer executable instructions defining a method comprising:
segmenting a plurality of meshes each corresponding to one of a plurality of organs in the 3D medical image;
initializing a level set by converting each of the plurality of meshes to a respective signed distance map; and
optimizing the level set by refining the respective signed distance map corresponding to each one of the plurality of organs to minimize a respective energy function.

20. The non-transitory computer readable medium of claim 19, further comprising:
generating a respective refined 3D mesh for each one of the plurality of organs from the respective refined distance map corresponding to each one of the plurality of organs.

21. The non-transitory computer readable medium of claim 19, wherein the respective energy function for each one of the plurality of organs includes a data energy term, a regularization energy term, and at least one energy term that imposes a geometric constraint on the respective signed distance function.

22. The non-transitory computer readable medium of claim 19, wherein the energy function includes a disjoint constraint energy term to remove overlaps between signed distance maps corresponding to adjacent organs.

23. The non-transitory computer readable medium of claim 22, wherein the disjoint energy term is expressed as:

$$E_O(\phi_A,\phi_B):=\int_\Omega H(\phi_A(x))H(\phi_B(x))\phi_B(x)dx,$$

where $\Phi_A$ and $\phi_B$ are signed distance maps corresponding to adjacent organs, and H is a Heaviside step function.

24. The non-transitory computer readable medium of claim 19, wherein the energy function includes a local proximity constraint energy term to remove gaps between portions of signed distance maps corresponding to portions of adjacent organs that stay in fixed proximity.

25. The non-transitory computer readable medium of claim 24, wherein the local proximity constraint energy term is expressed as:

$$E_d(\phi_A, \phi_B) := \frac{1}{2}\int_\Omega \beta_{l(x)}(\phi_A(x)+\phi_B(x)+D)^2\,dx,$$

where $\phi_A$ and $\phi_B$ are signed distance maps corresponding to first and second adjacent organs, D is a constant specifying a fixed proximity distance, l(x) is a set of correspondence points that provide shape correspondence, wherein the correspondence points are initialized using vertices of the segmented mesh for the first organ, and $\beta_{l(x)}$ is a correspondence point-bound weight that is greater than zero for correspondence points located a portions of the first organ that stay in fixed proximity with the second organ.

26. The non-transitory computer readable medium of claim 19, wherein the energy function includes a template constraint energy term enforce similarity of a refined distance map to the corresponding signed distance map initialized by converting one of the plurality of segmented meshes.

27. The non-transitory computer readable medium of claim 19, wherein the template constraint energy term is expressed as:

$$E_{sw}(\phi, \phi_P) := \frac{1}{2}\int_\Omega \omega_{l(x)}^{in}H(\phi_P(x)-\phi(x)) + \omega_{l(x)}^{out}H(\phi(x)-\phi_P(x))dx,$$

where $\phi$ is a current signed distance map corresponding to a first organ, $\phi_P$ is an initial signed distance map initialized from the segmented mesh of the first organ, H is a Heaviside step function, l(x) is a set of correspondence points that provide shape correspondence, wherein the correspondence points are initialized using vertices of the segmented mesh for the first organ, $\{w_i^{in}\}$ is a set of correspondence point-based weights applied to deviations inside a zero-crossing of $\phi_P$, and $\{w_i^{out}\}$ is a set of correspondence point-based weights applied to deviations outside a zero-crossing of $\phi_P$.

28. The non-transitory computer readable medium of claim 19, wherein the step of optimizing the level set by refining the respective signed distance map corresponding to each one of the plurality of organs to minimize a respective energy function comprises:
for each organ $O_{i=1,\ldots,N}$, calculating the energy minimization:

$$\min_{\phi_i} E_p(\phi_i) + E_c(\phi_i) + \sum_{j\in N_i(j)} E_O(\phi_i, \phi_j) + \sum_{j\in P_i(j)} E_d(\phi_i, \phi_j) + E_{sw}(\phi_i,\phi_i^0),$$

where $\phi_i$ is the signed distance map corresponding to $O_i$, $E_p(\phi_i)$ is a data energy term, $E_c(\phi_i)$ is a smoothing regularization energy term, $N_i$ denotes the indices of organs adjacent to $O_i$, $E_O(\phi_i, \phi_j)$ is a disjoint constraint energy term to remove overlaps between $\phi_i$ and $\phi_j$, $P_i$ denotes indices of organs with which $O_i$ shares a mutual proximity constraint, $E_d(\phi_i, \phi_j)$ is a local proximity constraint energy term to remove erroneous gaps between $\phi_i$ and $\phi_j$, $\phi_i^0$ is an initial signed distance map initialized from the segmented mesh corresponding to $O_i$, and $E_{sw}(\phi_i, \phi_j^o)$ is a template constraint energy term to enforce similarity in the shapes of $\phi_i$ and $\phi_i^o$.

29. The non-transitory computer readable medium of claim 19, wherein the step of optimizing the level set by refining the respective signed distance map corresponding to each one of the plurality of organs to minimize a respective energy function comprises:

minimizing the respective energy function for each of the plurality of organs using a plurality of interleaved gradient descent iterations, wherein at each iteration, the respective signed distance map corresponding to each one of the plurality of organs is refined to reduce the respective energy function.

* * * * *